United States Patent
Choi et al.

(10) Patent No.: US 12,417,174 B2
(45) Date of Patent: Sep. 16, 2025

(54) METHOD AND APPARATUS WITH MEMORY MANAGEMENT BASED ON MEMORY GROUP

(71) Applicant: SAMSUNG ELECTRONICS CO., LTD., Suwon-si (KR)

(72) Inventors: Jungsik Choi, Suwon-si (KR); Ruth Kim, Suwon-si (KR); Jin-Hong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 18/467,065

(22) Filed: Sep. 14, 2023

(65) Prior Publication Data
US 2024/0256445 A1 Aug. 1, 2024

(30) Foreign Application Priority Data
Jan. 26, 2023 (KR) ........................ 10-2023-0010174

(51) Int. Cl.
*G06F 12/08* (2016.01)

(52) U.S. Cl.
CPC .................................... *G06F 12/08* (2013.01)

(58) Field of Classification Search
None
See application file for complete search history.

(56) References Cited

U.S. PATENT DOCUMENTS

| | | |
|---|---|---|
| 9,740,631 B2 | 8/2017 | Shiu |
| 11,210,253 B2 | 12/2021 | Duluk, Jr. et al. |
| 11,443,406 B2 | 9/2022 | Schluessler et al. |
| 2005/0193169 A1* | 9/2005 | Ahluwalia .......... G06F 12/1009 711/115 |

(Continued)

FOREIGN PATENT DOCUMENTS

KR 10-1999132 B1 10/2019

OTHER PUBLICATIONS

Basu, Arkaprava, et al., "Efficient Virtual Memory for Big Memory Servers," ACM SIGARCH Computer Architecture News 41.3, 2013 (12 Pages in English).

(Continued)

*Primary Examiner* — Edward J Dudek, Jr.
*Assistant Examiner* — Ralph A Verderamo, III
(74) *Attorney, Agent, or Firm* — NSIP Law

(57) ABSTRACT

An electronic device includes: a host processor configured to: generate a memory group allocated to an expanded virtual memory in response to receiving memory usage information; determine a target memory group comprising a page on which a page fault has occurred among memory groups allocated to the expanded virtual memory, based on the memory usage information; and migrate the target memory group from one of a host memory, an accelerator memory, and a storage device, which comprises the target memory group, to either one of the host memory and the accelerator memory in which the page fault has occurred; and an accelerator configured to perform an operation using (Continued)

the accelerator memory, wherein the expanded virtual memory is a virtual single address space using the host memory, the accelerator memory, and the storage device.

20 Claims, 6 Drawing Sheets

(56) References Cited

U.S. PATENT DOCUMENTS

| | | |
|---|---|---|
| 2015/0206277 A1 | 7/2015 | Rao et al. |
| 2018/0018750 A1 | 1/2018 | Jones et al. |
| 2019/0147561 A1 | 5/2019 | Jones et al. |
| 2021/0157593 A1* | 5/2021 | Gu .................... G06F 9/3802 |
| 2022/0197811 A1* | 6/2022 | Ganguly ............ G06F 12/0862 |
| 2022/0214825 A1* | 7/2022 | Ganguly ............ G06F 3/0647 |

OTHER PUBLICATIONS

Markthub, Pak, et al., "DRAGON: Breaking GPU Memory Capacity Limits with Direct NVM Access," SC18: International Conference for High Performance Computing, Networking, Storage and Analysis. IEEE, Sep. 11-16, 2018 (13 Pages in English).

Ganguly, Debashis, et al., "Interplay Between Hardware Prefetcher and Page Eviction Policy in Cpu-Gpu Unified Virtual Memory," Proceedings of the 46th International Symposium on Computer Architecture, Jun. 22-26, 2019 (12 Pages in English).

Jung, Jaehoon et al., "SnuRHAC: A Runtime for Heterogeneous Accelerator Clusters with CUDA Unified Memory," Session: Programming for Distributed and Accelerated Systems, Jun. 22-25, 2021 (14 Pages in English).

Allen, Tyler, et al., "In-Depth Analyses of Unified Virtual Memory System for GPU Accelerated Computing," Proceedings of the International Conference for High Performance Computing, Networking, Storage and Analysis, Nov. 14-19, 2021 (14 Pages in English).

Li, Youjie et al., "Harmony: Overcoming the Hurdles of GPU Memory Capacity to Train Massive DNN Models on Commodity Servers," arXiv:2202.01306, 2022 (p. 2747-2760).

* cited by examiner

METHOD AND APPARATUS WITH MEMORY MANAGEMENT BASED ON MEMORY GROUP

CROSS-REFERENCE TO RELATED APPLICATIONS

This application claims the benefit under 35 USC § 119(a) of Korean Patent Application No. 10-2023-0010174, filed on Jan. 26, 2023 in the Korean Intellectual Property Office, the entire disclosure of which is incorporated herein by reference for all purposes.

BACKGROUND

1. Field

The following description relates to a method and apparatus with memory management based on a memory group.

2. Description of Related Art

A central processing unit (CPU) memory and a graphics processing unit (GPU) memory may be physically separated and divided by a peripheral component interconnect express bus (PCI-Express Bus). Data shared by a CPU and a GPU may need to be allocated to both the CPU memory and the GPU memory. Thus, it may be complicated for a programmer to design or write a program.

When an expanded virtual memory that integrated the CPU memory and the GPU memory is used, it may be easier to design or write the program. The CPU memory and the GPU memory may be physically different memory devices. However, by virtually providing a single address space, an expanded virtual memory space expanded to a CPU memory that is larger than the GPU memory may be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an electronic device includes: a host processor configured to: generate a memory group allocated to an expanded virtual memory in response to receiving memory usage information; determine a target memory group comprising a page on which a page fault has occurred among memory groups allocated to the expanded virtual memory, based on the memory usage information; and migrate the target memory group from one of a host memory, an accelerator memory, and a storage device, which comprises the target memory group, to either one of the host memory and the accelerator memory in which the page fault has occurred; and an accelerator configured to perform an operation using the accelerator memory, wherein the expanded virtual memory is a virtual single address space using the host memory, the accelerator memory, and the storage device.

For the generating of the memory group, the host processor may be configured to receive the memory usage information through a hint function configured to input the memory usage information, wherein hint function comprises information about a feature of data included in the generated memory group.

The memory usage information may include a start address of the memory group in the expanded virtual memory, a size of the memory group in the expanded virtual memory, whether the memory group is allocated to the expanded virtual memory, and role information of the memory group.

The role information of the memory group may be information about a feature of data included in the memory group.

For the migrating of the target memory group, the host processor may be configured to migrate all pages included in the target memory group comprising the page on which the page fault has occurred.

The host processor may be configured to manage the memory groups allocated to the expanded virtual memory with an algorithm configured to perform a range search.

For the managing of the memory groups allocated to the expanded virtual memory with the algorithm configured to perform the range search, the host processor may be configured to determine the target memory group comprising the page on which the page fault has occurred, using the algorithm configured to perform the range search.

For the migrating of the target memory group, the host processor may be configured to, in response to an insufficient space in the host memory to which the target memory group migrates, determine a page that is last accessed among pages included in the host memory and remove all pages included in target memory group to which the page that is last accessed belongs from the host memory.

For the migrating of the target memory group, the host processor may be configured to, in response to an insufficient space in the accelerator memory to which the target memory group migrates, determine a page that is last accessed among pages included in the accelerator memory and remove all pages included in target memory group to which the page that is last accessed belongs from the accelerator memory.

For the migrating of the target memory group, the host processor may be configured to preferentially migrate pages adjacent to the page on which the page fault has occurred among all the pages included in the target memory group.

In one or more general aspects, a processor-implemented method of operating an electronic device includes: generating a memory group allocated to an extended virtual memory in response to receiving memory usage information; determining a target memory group comprising a page on which a page fault has occurred among memory groups allocated to the expanded virtual memory, based on the memory usage information; and migrating the target memory group from one of a host memory, an accelerator memory, and a storage device, which may include the target memory group to either one of the host memory and the accelerator memory in which the page fault has occurred, wherein the expanded virtual memory is a virtual single address space using the host memory, the accelerator memory, and the storage device.

The generating of the memory group may include generating the memory group in response to receiving the memory usage information through a hint function configured to input the memory usage information, wherein hint function may include information about a feature of data included in the generated memory group.

The memory usage information may include a start address of the memory group in the expanded virtual memory, a size of the memory group in the expanded virtual memory, whether the memory group is allocated to the expanded virtual memory, and role information of the memory group.

The role information of the memory group may be information about a feature of data included in the memory group.

The migrating of the target memory group may include migrating all pages included in the target memory group comprising the page on which the page fault has occurred.

The may include managing the memory groups allocated to the expanded virtual memory with an algorithm configured to perform a range search.

The managing of the memory groups allocated to the expanded virtual memory with the algorithm configured to perform the range search may include determining the target memory group comprising the page on which the page fault has occurred using the algorithm configured to perform the range search.

The migrating of the target memory group may include, in response to an insufficient space in the host memory to which the target memory group migrates, determining a page that is last accessed among pages included in the host memory and removing all pages included in target memory group to which the page that is last accessed belongs from the host memory.

The migrating of the target memory group may include, in response to an insufficient space in the accelerator memory to which the target memory group migrates, determining a page that is last accessed among pages included in the accelerator memory and removing all pages included in target memory group to which the page that is last accessed belongs from the accelerator memory.

The migrating of the target memory group may include preferentially migrating pages adjacent to the page on which the page fault has occurred among all the pages included in the target memory group.

Other features and aspects will be apparent from the following detailed description, the drawings, and the claims.

Figure 1:
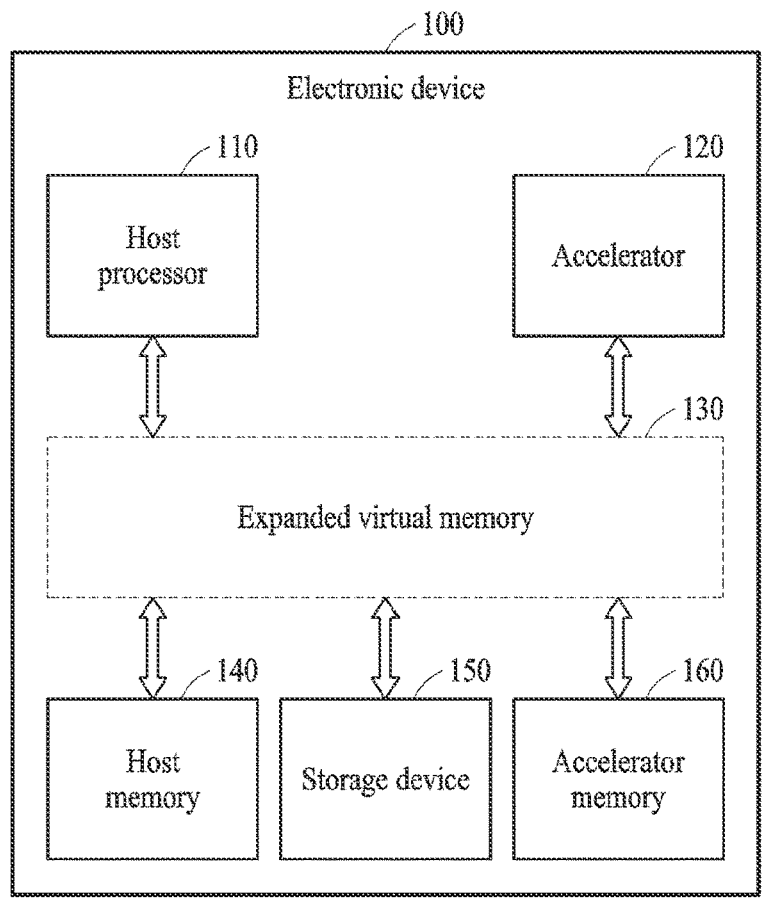
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms, such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meanings as those generally understood by one of ordinary skill in the art to which this disclosure pertains and based on an understanding of the disclosure of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an electronic device.

Referring to FIG. 1, an electronic device 100 including a host processor 110 (e.g., one or more processors), an accelerator 120 (e.g., one or more accelerators), a host memory 140 (e.g., one or more memories), a storage device 150 (e.g., one or more storage devices), and an accelerator memory 160 (e.g., one or more accelerator memories) is illustrated. The host processor 110, the accelerator 120, the host memory 140, the storage device 150, and the accelerator memory 160 may communicate with each other via a bus, a network-on-chip (NoC), a peripheral component interconnect express (PCIe), and the like. Only components related to the present example are illustrated in the electronic device 100 of FIG. 1. Thus, it will be apparent to one of ordinary skill in the art, with an understanding of the disclosure of the present disclosure, that the electronic device 100 may further include general-purpose components other than the components illustrated in FIG. 1.

The host processor 110 may perform overall functions to control the electronic device 100. The host processor 110 may generally control the electronic device 100 by executing programs and/or instructions stored in memories. The host processor 110 may be implemented as a central processing unit (CPU), a graphics processing unit (GPU), an application processor (AP), and the like but is not limited thereto.

The electronic device 100 may include the accelerator 120 (or a hardware accelerator) for operations. The accelerator 120 may process tasks that are, due to a characteristic of the tasks, more efficiently processed by a separate dedicated processor (e.g., the accelerator 120) than by the host processor 110 configured for general purpose. One or more processing elements (PEs) included in the accelerator 120 may be used. For example, the accelerator 120 may correspond to a neural processing unit (NPU), a tensor processing unit (TPU), a digital signal processor (DSP), a GPU, a neural engine, and the like.

The host memory 140, the storage device 150, and the accelerator memory 160 may be hardware configured to store data that is processed or may be processed by the electronic device 100. In addition, the host memory 140, the storage device 150, and the accelerator memory 160 may store an application, a driver, and the like to be executed by the electronic device 100. The host memory 140, the storage device 150, and the accelerator memory 160 may include a volatile memory, such as dynamic random-access memory (DRAM), and/or a non-volatile memory.

The host memory 140 may be a memory of the host processor 110. Data may be allocated to the host memory 140 for the host processor 110 to perform an operation. For example, when the host processor 110 is a CPU, the host memory 140 may be DRAM as the CPU memory. For example, the host memory 140 may be a memory connected to the electronic device 100 through a computer express link (CXL) interface. In a non-limiting example, the host memory 140 may be or include a non-transitory computer-readable storage medium storing instructions that, when executed by the host processor 110, configure the host processor 110 to perform any one, any combination, or all of operations and methods of the host processor 110 disclosed herein with reference to FIGS. 1-9.

The accelerator memory 160 may be a memory of the accelerator 120. Data may be allocated to the accelerator memory 160 for the accelerator 120 to perform an operation. For example, when the accelerator 120 is the GPU, the accelerator memory 160 may be a GPU memory.

The storage device 150 may be hardware configured to store data processed by the electronic device 100 and may store an application, a driver, and the like to be executed by the electronic device 100. Space of the storage device 150 may be larger than the space of the host memory 140 and the accelerator memory 160. The storage device 150 may include a solid-state drive (SSD), a hard disk drive (HDD), and the like but is not limited thereto.

An expanded virtual memory 130 may be a virtual single address space using the host memory 140, the storage device 150, and the accelerator memory 160. For example, the expanded virtual memory 130 may be an expanded virtual memory integrating the host memory 140, the storage device 150, and the accelerator memory 160. The size of the expanded virtual memory 130 may be the sum of the size of the host memory 140, the size of the accelerator memory 160, and the size of the free space of the storage device 150. The expanded virtual memory 130 may use the free space of the storage device 150, like the host memory 140 and/or the accelerator memory 160.

Thus, as the size of the expanded virtual memory 130 may be expanded to the free space of the storage device 150, the electronic device 100 of one or more embodiments may more easily execute an application when executing the application, for example, uses a memory capacity larger than the size of the host memory 140 and the accelerator memory 160.

Figure 2:
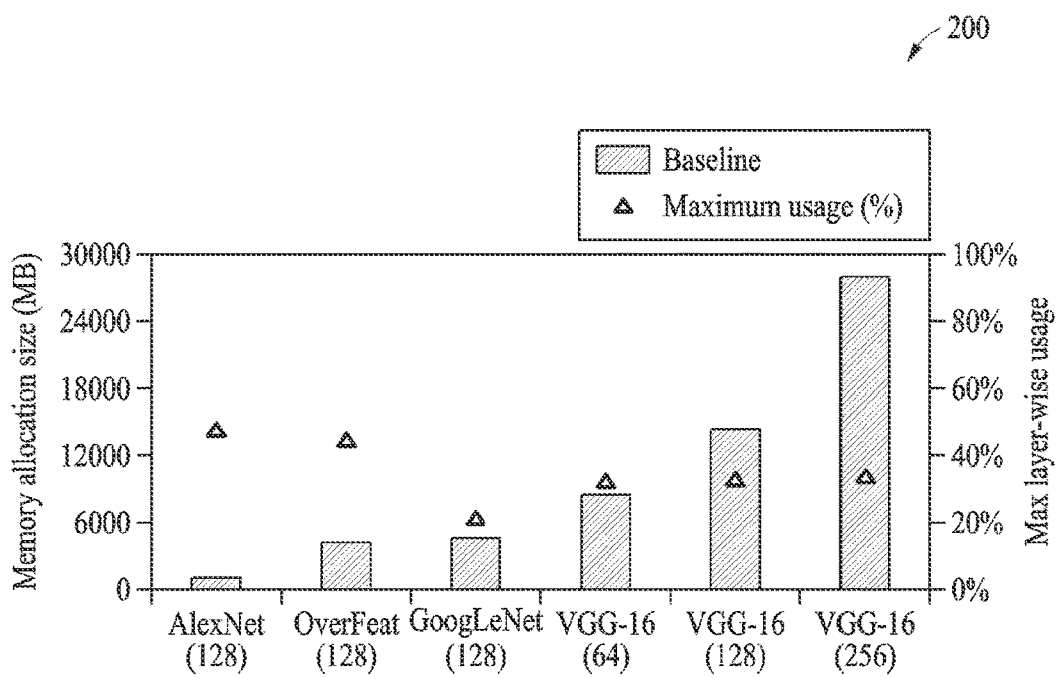
FIG. 2 illustrates a graph of an example of increase of memory usage of deep learning models.

FIG. 2 illustrates a graph of an example of increase of memory usage of deep learning models.

Referring to FIG. 2, a graph 200 showing an increase of the memory usage of the deep learning models due to technological development in the last 10 years is illustrated. Referring to the graph 200, it is shown that the deep learning models have developed in a way that the size of the models increases in order to improve accuracy of learning. Accordingly, a memory capacity used for learning of a deep learning model may gradually increase. For example, GPT-3, one of the language models, may include around 175 billion learning parameters, and the memory capacity used for learning through GPT-3 may exceed 1000 GB. Thus, the expanded virtual memory 130 of FIG. 1 may support a significantly large virtual memory by supporting up to the size of the free space of the storage device 150. Therefore, by using the expanded virtual memory 130, the electronic device 100 of one or more embodiments may learn with and execute a significantly large deep learning model.

Figure 3:
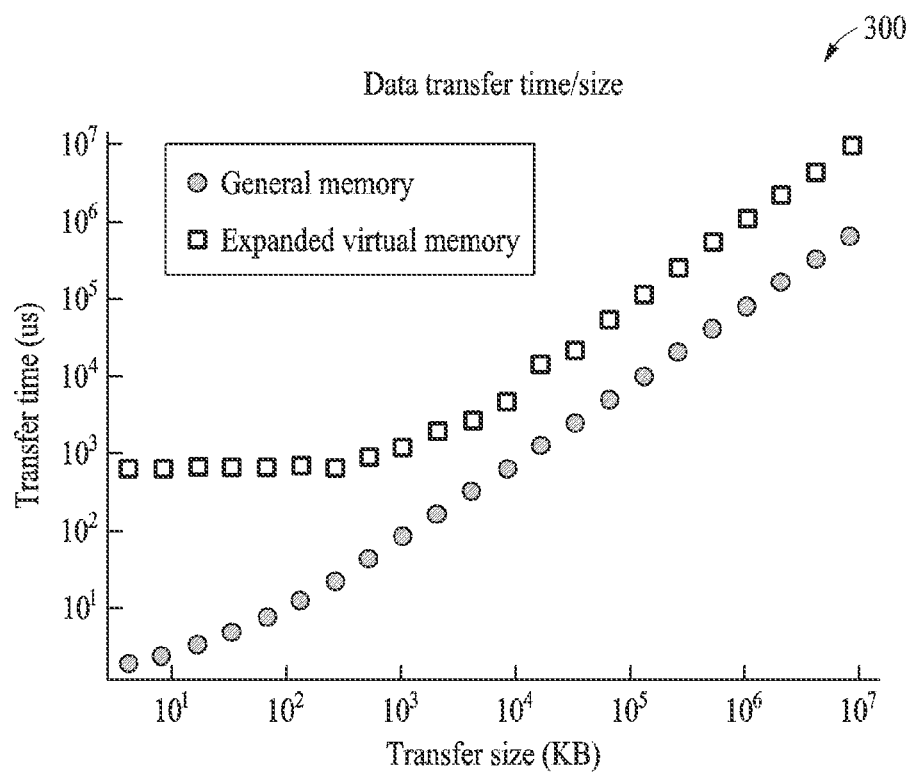
FIG. 3 illustrates a graph of an example of comparison of latency time in an expanded virtual memory and a general memory.

FIG. 3 illustrates a graph 300 of an example of comparison of latency time in an expanded virtual memory and a general memory.

As described with reference to FIG. 1, the expanded virtual memory 130 using the host memory 140, the storage device 150, and the accelerator memory 160 may train or execute the deep learning model of a large size by providing a significantly large expanded virtual memory 130 expanded to the storage device 150. However, software overhead incurred to support the expanded virtual memory 130 may be significantly large.

The graph 300 may be a graph showing a comparison of the latency time of the expanded virtual memory 130 (expanded to the host memory 140 and the accelerator memory 160, for example) and the latency time of the general memory. Referring to the graph 300, it is shown that the latency time of the expanded virtual memory 130 is higher than the latency time of the general memory.

The latency time of the expanded virtual memory 130 may be higher than the latency time of the general memory when the expanded virtual memory 130 operates based on demand paging. When the expanded virtual memory 130 of a typical electronic device accesses the host memory 140, the accelerator memory 160, or the storage device 150, when a page fault occurs, a page on which the page fault has occurred may be placed to the memory the expanded virtual memory 130 accessed by a page fault handler. Due to the above operation, the latency time of the expanded virtual memory 130 of the typical electronic device may be high. In contrast, to reduce the latency time of the expanded virtual memory 130, the electronic device 100 of one or more embodiments may implement a method of prefetching a page. For such prefetching, the electronic device 100 may determine how a virtual memory (e.g., the expanded virtual memory 130) is used. Hereinafter, a method for a deep learning application 410 to use a virtual memory is described.

Figure 4:
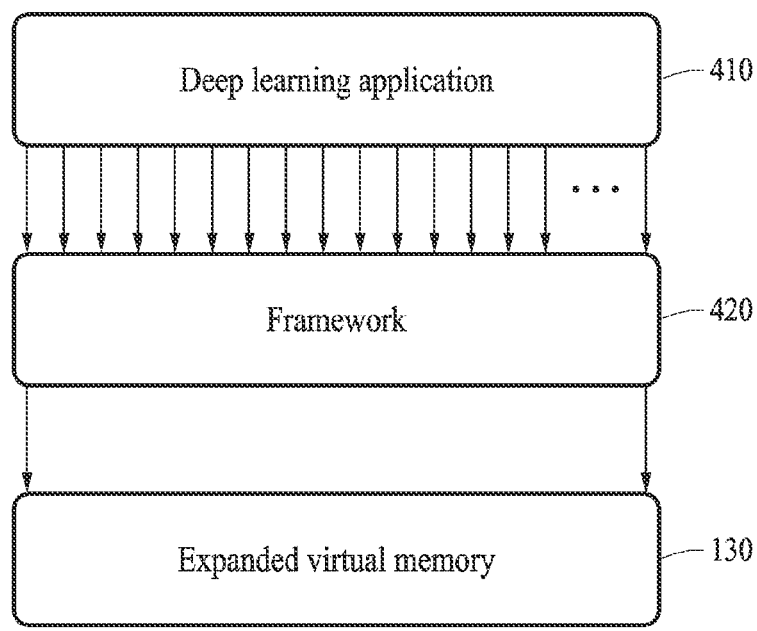
FIG. 4 illustrates an example of memory allocation of an application.

FIG. 4 illustrates an example of memory allocation of an application.

The deep learning application 410 may, to reduce overhead, manage the memory by making a dedicated memory pool rather than requesting allocation and/or release of the memory from the expanded virtual memory 130.

The deep learning application 410, when executed, may manage the memory through a framework 420. The deep learning application 410, when executed, may be allocated to the memory to use through the framework 420 and manage the memory in the memory pool. The deep learning application 410 may request allocation when the memory is determined to be used and request release when the memory usage is finished. However, the framework 420 may process the request internally and not request the allocation and release of the memory from the extended virtual memory 130. The framework 420 may often request the allocation and release of the memory from the expanded virtual memory 130 to maintain the internal memory pool.

Thus, the expanded virtual memory 130 of the typical electronic device may not determine how the deep learning application 410 uses the memory. In contrast, the expanded virtual memory 130 of the electronic device 100 of one or more embodiments may determine how the deep learning application 410 uses the memory, thereby reducing the latency time by prefetching a page. Hereinafter, an example method of notifying the expanded virtual memory 130 of how the deep learning application 410 uses the memory is described.

Figure 5A:
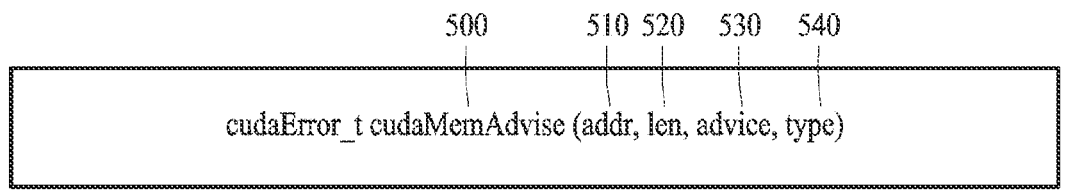
FIGS. 5A and 5B illustrate an example of allocation of memory groups.
Figure 5B:
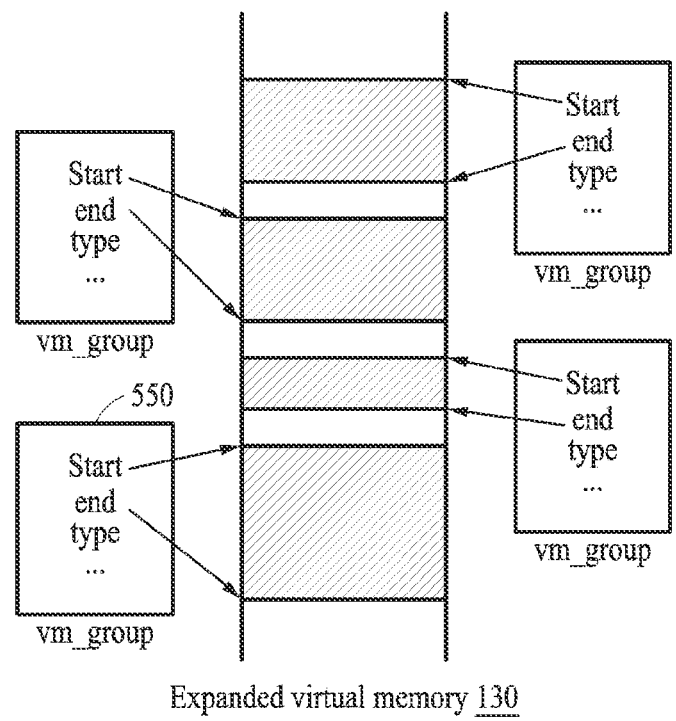

FIGS. 5A and 5B illustrate an example of allocation of memory groups.

Referring to FIG. 5A, a hint function 500 is illustrated. The hint function 500 may be a function that is configured to receive memory usage information of a memory group input from a user. The memory group may be a unit for managing the memory allocated to the expanded virtual memory 130 by the hint function 500. The memory group may include a plurality of pages. For example, the plurality of pages may be managed in the memory group.

The hint function 500 may be an application programming interface (API). The hint function 500 may be an expansion of an existing function to receive the memory usage information input from the user. Alternatively, the hint function 500 may be a newly defined function to receive the memory usage information input from the user.

The hint function 500 of FIG. 5A may be a function that expands cudaMemAdvise, which is an API. For example, the hint function 500 may receive an address 510 (e.g., addr of FIG. 5A), a length 520 (e.g., len of FIG. 5A), an advice 530 (e.g., advice of FIG. 5A), and a type 540 (e.g., type of FIG. 5A) input from the user.

For example, the address 510 may represent a start address of the memory group in the expanded virtual memory 130. The length 520 may represent the size of the memory group in the expanded virtual memory 130.

The advice 530 may represent whether the memory group is allocated to the expanded virtual memory 130. When the advice 530 is set, the memory group may be allocated to the expanded virtual memory 130, and when the advice 530 is unset, the memory group may be removed from the expanded virtual memory 130.

The type 540 may represent role information of the memory group. The role information may be information about a feature of data included in the memory group. For example, when the data included in the memory group is a matrix, the role information may include information about sparsity or density of the matrix. For example, the role information may include information about when the memory group is set and when the memory group is unset.

The memory usage information may include the address 510, the length 520, the advice 530, and the type 540 described above. Thus, the memory usage information may be a kind of hint on how the memory group is used. As a result, the expanded virtual memory 130 may obtain the hint on the data included in the memory group through the memory usage information received as an input from the user.

Referring to FIG. 5B, memory groups allocated to the expanded virtual memory 130 are illustrated. The allocated memory groups may be managed as a structure. For example, referring to FIG. 5B, the memory groups allocated to the expanded virtual memory 130 may be managed as a vm_group structure. However, the vm_group structure is only an example and the memory groups are not limited thereto.

Here, "Start" may correspond to the address 510. "end" may correspond to the sum of the address 510 and the length 520. "type" may correspond to the type 540.

Different memory groups may include different pages. In addition, different memory groups may include different numbers of pages.

Figure 6:
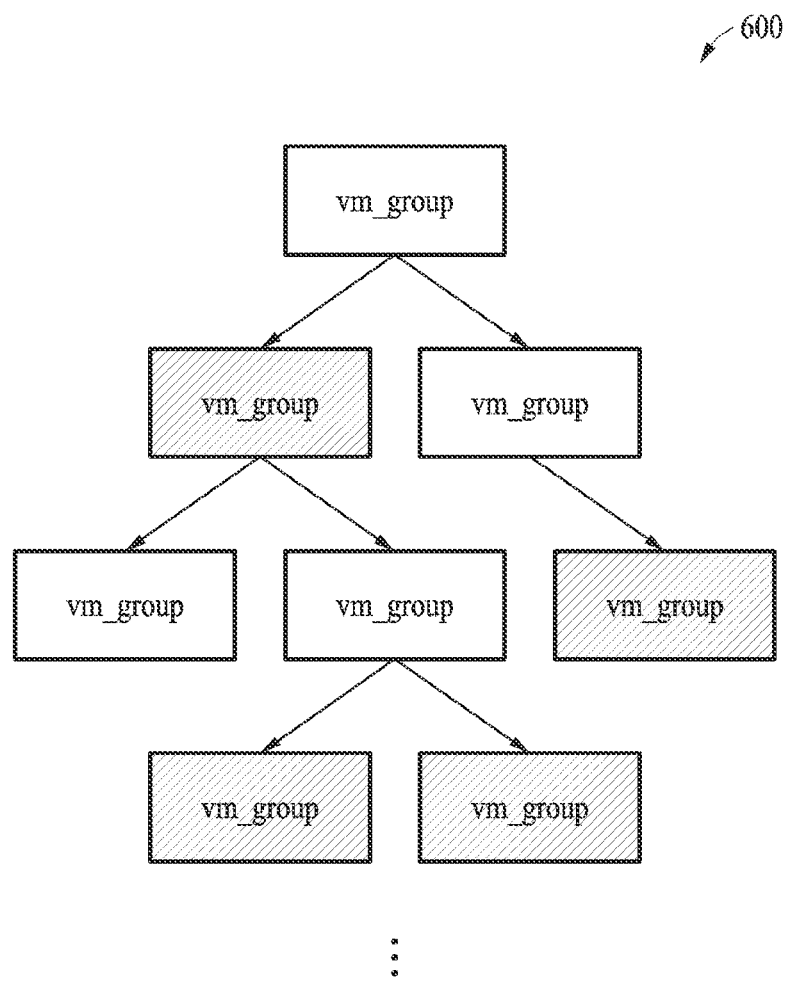
FIG. 6 illustrates an example of managing a structure.

FIG. 6 illustrates an example of managing a structure.

The structure to manage the memory groups may be quickly searched for using a specific virtual address. When the page fault occurs, the structure to manage the memory groups may be quickly searched for to perform page fault handling using information included in the structure.

When the virtual address of the page on which the page fault has occurred is provided, as the structure to manage the memory group including the virtual address is to be found, an algorithm configured to perform a range search may be used to manage the structure.

Referring to FIG. 6, a red-black tree 600, which is an example of the algorithm configured to perform the range search, is illustrated. The red-black tree 600 is only an example of the algorithm that may be used to manage the structure, and the algorithm is not limited thereto. Thus, any algorithm configured to perform the range search may be used to find the structure including the page on which the page fault has occurred.

Figure 7:
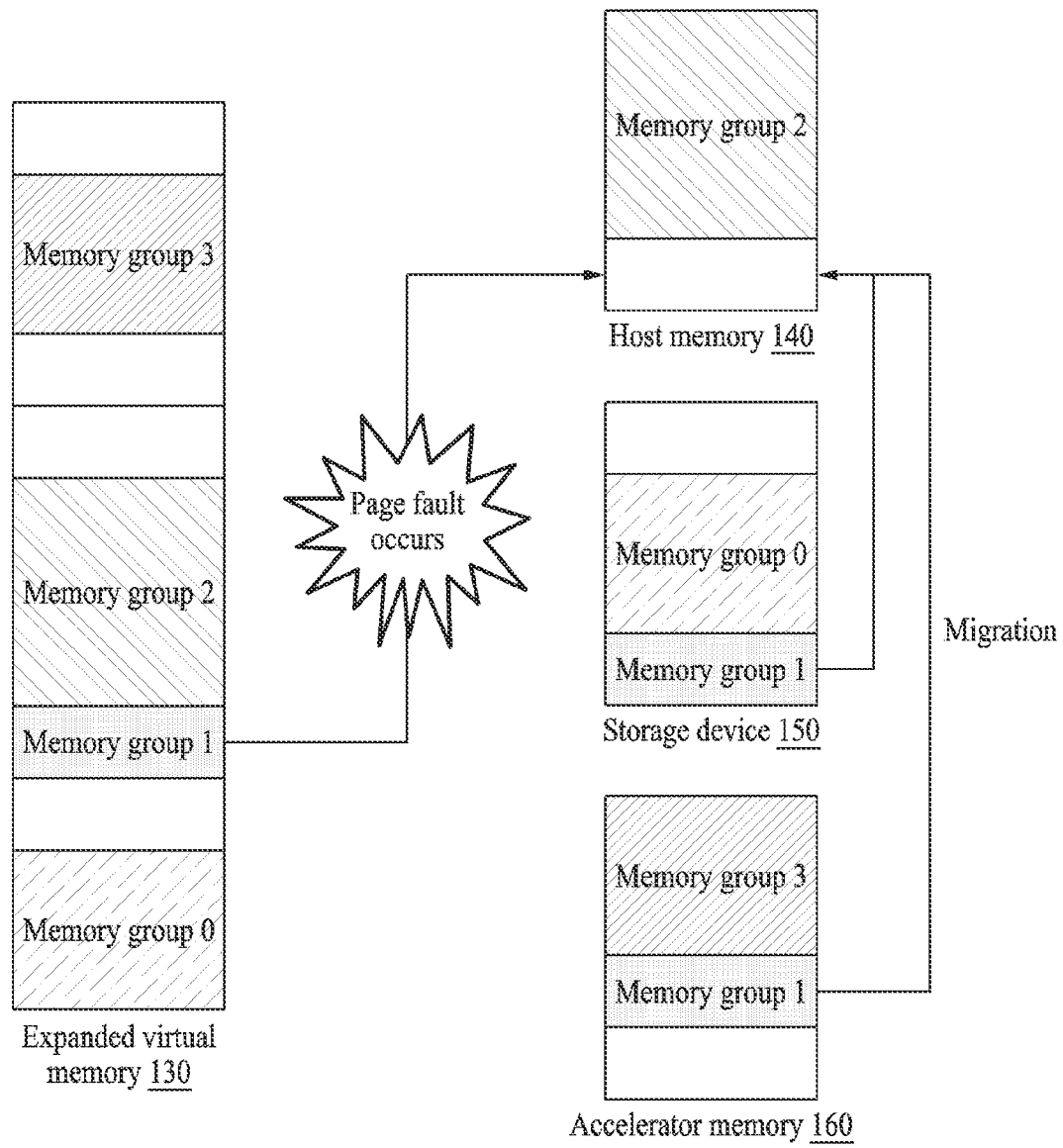
FIG. 7 illustrates an example of migration of memory groups.

FIG. 7 illustrates an example of migration of memory groups.

Referring to FIG. 7, a method of migrating memory groups when a page fault occurs is described.

The expanded virtual memory 130, a kind of virtual memory, may be a physically different memory device but configured to virtually provide a single address space, thus providing convenience in programming. The expanded virtual memory 130 may operate based on demand paging.

In an example, the host processor 110 may access a page included in a memory group 1 for an operation. The host processor 110 may perform the operation using data in the host memory 140 only. Referring to the host memory 140, the host memory 140 may include a memory group 2 but may not include the memory group 1. Thus, the page fault may occur when the memory group 1 is included in the expanded virtual memory 130 but the page included in the memory group 1 is not included in the host memory 140.

The storage device 150 and/or the accelerator memory 160 may include the memory group 1. Thus, when the page fault occurs, the memory group 1 of the storage device 150 or the accelerator memory 160 may migrate to the host memory 140. When the memory group 1 migrates to the host memory 140, the host processor 110 may access the memory group 1 of the host memory 140.

Here, not only the page on which the page fault has occurred may migrate, but a target memory group including the page may migrate. An example method of finding the target memory group including the page on which the page fault has occurred is described above with reference to FIG. 6. For example, the structure including the page may be found using the address of the page on which the page fault has occurred. The structure may be the target memory group including the page on which the page fault has occurred.

When the target memory group including the page migrates, all pages included in the target memory group including the page on which the page fault has occurred may migrate. The page fault may be predicted to occur on the pages included in the target memory group including the page on which the page fault has occurred after the page fault has occurred. Thus, by migrating all the pages included in the target memory group, the electronic device of one or more embodiments may obtain an effect of prefetching pages on which the page fault has not yet occurred but is predicted to occur.

Accordingly, the electronic device of one or more embodiments may reduce the number of the occurrence of page faults by migrating all the pages included in the target memory group, but handling time may increase when the size of target memory group is large when the pages migrate in memory group units. When the handling time increases, the deep learning application 410 may wait in standby status. Thus, by preferentially migrating pages adjacent to the page on which the page fault has occurred, the electronic device of one or more embodiments may reduce the handling time. For example, by synchronously migrating the pages adjacent to the page on which the page fault has occurred and asynchronously processing pages not adjacent to the page on which the page fault has occurred in the background, the electronic device of one or more embodiments may reduce the handling time.

The description above may be applied not only when the page fault occurs in the host memory 140 and the target memory group migrates in the storage device 150 or the accelerator memory 160 but also when the page fault occurs in the accelerator memory 160 and the target memory group migrates in the storage device 150 or the host memory 140.

An example policy to remove the memory group when a memory space is insufficient even though the migration is performed because the page fault has occurred is described below.

Figure 8:
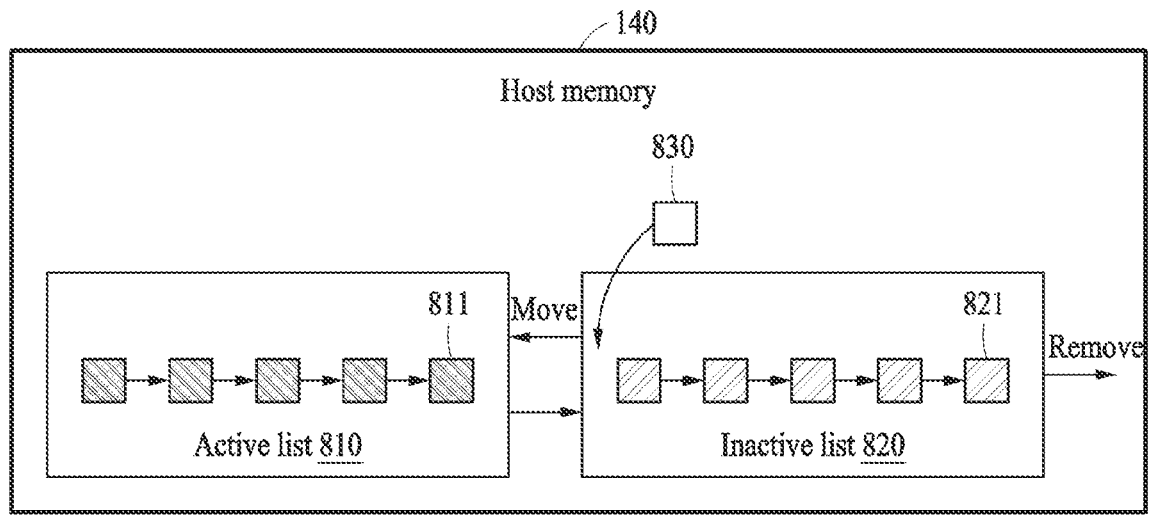
FIG. 8 illustrates an example of removing a memory group.

FIG. 8 illustrates an example of removing a memory group.

Referring to FIG. 8, the host memory 140 is illustrated. However, it will be apparent to one of ordinary skill in the art that the removing of the memory group may be applied to not only the host memory 140 but also to other memories of the electronic device 100 (e.g., the accelerator memory 160).

The host memory 140 may include a plurality of memory groups. The plurality of memory groups may be managed by two least recently used (LRU) lists. The two LRU lists may be an active list 810 and an inactive list 820. The active list 810 may manage hot memory groups with a lot of accesses. The inactive list 820 may manage cold memory groups with few accesses. The active list 810 and the inactive list 820 may each include a plurality of memory groups.

When a new memory group 830 is input to the host memory 140 for the first time, the new memory group 830 may be added to the inactive list 820. Among the memory groups included in the inactive list 820, memory groups repeatedly accessed may be moved to the active list 810. On the other hand, when there are too many memory groups in the active list 810 (e.g., when there are more memory groups in the active list 810 than the active list 810 is configured to manage, and/or when there the number of memory groups in the active list 810 is the maximum number of memory groups the active list 810 is configured to manage and another memory group is determined to be moved to the active list 810), a last accessed memory group 811 may be moved to the inactive list 820. In an example, when there are too many memory groups in the active list 810, the host processor 110 may move at least one of the memory groups in the active list 810 to the inactive list 820.

When there are too many memory groups in the inactive list 820 (e.g., when there are more memory groups in the inactive list 820 than the inactive list 820 is configured to manage, and/or when there the number of memory groups in the inactive list 820 is the maximum number of memory groups the inactive list 820 is configured to manage and another memory group is determined to be moved to the active list 810), a last accessed memory group 821 of the inactive list 820 may be removed. In an example, when there are too many memory groups in the inactive list 820, the host processor 110 may move the last accessed memory group 821 of the inactive list 820 to another memory device (e.g., the storage device 150, the expanded virtual memory 130, the accelerator memory 160, and the like) and remove the last accessed memory group 821 of the inactive list 820 from the host memory 140.

The host processor 110 may move part of the last accessed memory group 821 of the inactive list 820 to another memory device and remove the part of the last accessed memory group 821 of the inactive list 820 from the host memory 140. Then, the host processor 110 may move the rest of the last accessed memory group 821 of the inactive list 820 to another memory device and remove the rest of the last accessed memory group 821 of the inactive list 820 from the host memory 140.

Figure 9:
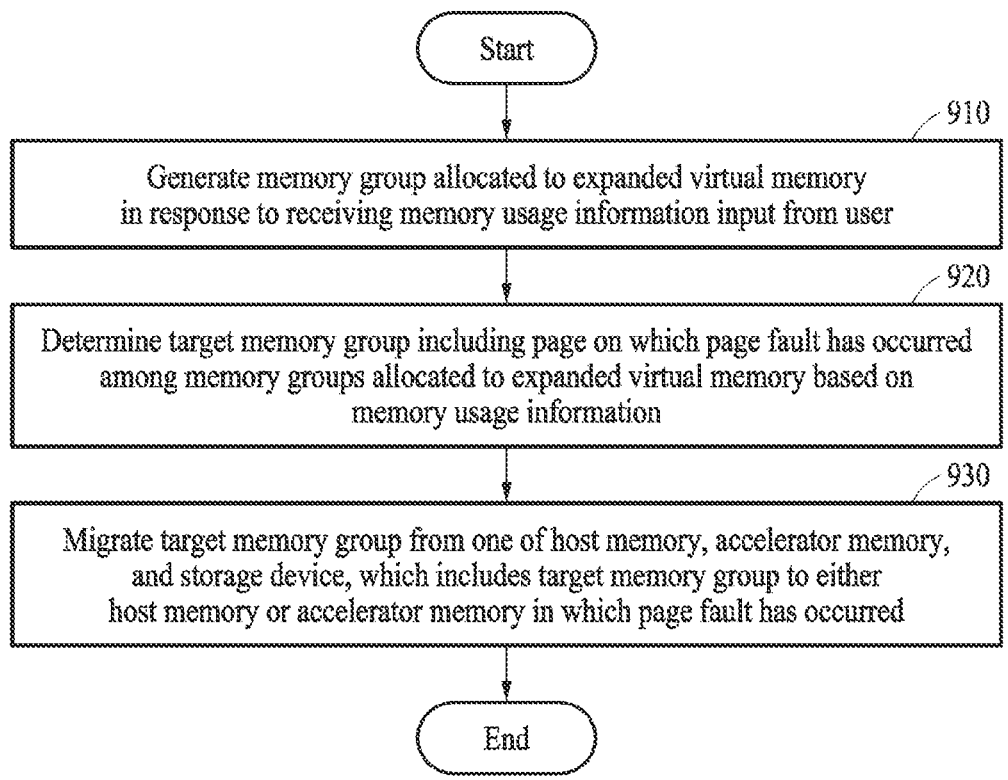
FIG. 9 illustrates an example of an operation of an electronic device.

FIG. 9 illustrates an example of an operation of an electronic device.

Each operation may be performed sequentially, but not necessarily sequentially performed. For example, an order of each operation may be changed and at least two operations may be performed in parallel. Operations 910 to 930 may be performed by the electronic device 100 of FIG. 1. For example, the host processor 110 of the electronic device 100 may perform the below operations.

In operation 910, a host processor may generate a memory group allocated to an expanded virtual memory in response to receiving memory usage information input from a user.

In operation 920, the host processor may determine a target memory group including a page on which a page fault has occurred among memory groups allocated to the expanded virtual memory, based on the memory usage information.

In operation 930, the host processor may migrate the target memory group from one of a host memory, an accelerator memory, and a storage device, which includes the target memory group to either the host memory or the accelerator memory in which the page fault has occurred.

The electronic devices, host processors, accelerators, host memories, storage devices, accelerator memories, electronic device 100, host processor 110, accelerator 120, host memory 140, storage device 150, accelerator memory 160, and other apparatuses, devices, units, modules, and components disclosed and described herein with respect to FIGS. 1-9 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An electronic device comprising:
a host processor configured to:
generate, in response to receiving memory usage information, a memory group allocated to an expanded virtual memory, the expanded virtual memory is a virtual single address space using a host memory, an accelerator memory, and a storage device;
determine, based on the memory usage information, from among memory groups allocated to the expanded virtual memory, a target memory group comprising a page on which a page fault has occurred; and
migrate the target memory group from one of the host memory, the accelerator memory, and the storage device that includes the target memory group, to either one of the host memory and the accelerator memory in which the page fault has occurred; and
an accelerator configured to perform an operation using the accelerator memory,
wherein the memory groups comprise a first memory group and a second memory group having different allocations of at least one of the host memory, the accelerator memory, and the storage device.

2. The electronic device of claim 1, wherein, for the generating of the memory group, the host processor is configured to receive the memory usage information through a hint function configured to input the memory usage information, wherein hint function comprises information about a feature of data included in the generated memory group.

3. The electronic device of claim 1, wherein the memory usage information comprises a start address of the memory group in the expanded virtual memory, a size of the memory group in the expanded virtual memory, whether the memory group is allocated to the expanded virtual memory, and role information of the memory group.

4. The electronic device of claim 3, wherein the role information of the memory group is information about a feature of data included in the memory group.

5. The electronic device of claim 1, wherein, for the migrating of the target memory group, the host processor is configured to migrate all pages included in the target memory group comprising the page on which the page fault has occurred.

6. The electronic device of claim 1, wherein the host processor is configured to manage the memory groups allocated to the expanded virtual memory with an algorithm configured to perform a range search.

7. The electronic device of claim 6, wherein, for the managing of the memory groups allocated to the expanded virtual memory with the algorithm configured to perform the range search, the host processor is configured to determine the target memory group comprising the page on which the page fault has occurred, using the algorithm configured to perform the range search.

8. The electronic device of claim 1, wherein, for the migrating of the target memory group, the host processor is configured to, in response to an insufficient space in the host memory to which the target memory group migrates, determine a page that is last accessed among pages included in the host memory and remove all pages included in target memory group to which the page that is last accessed belongs from the host memory.

9. The electronic device of claim 1, wherein, for the migrating of the target memory group, the host processor is configured to, in response to an insufficient space in the accelerator memory to which the target memory group migrates, determine a page that is last accessed among pages included in the accelerator memory and remove all pages included in target memory group to which the page that is last accessed belongs from the accelerator memory.

10. The electronic device of claim 1, wherein, for the migrating of the target memory group, the host processor is configured to preferentially migrate pages adjacent to the page on which the page fault has occurred among all the pages included in the target memory group.

11. A processor-implemented method of operating an electronic device, the method comprising:
generating, in response to receiving memory usage information, a memory group allocated to an expanded virtual memory, the expanded virtual memory is a virtual single address space using a host memory, an accelerator memory, and a storage device;
determining, based on the memory usage information, from among memory groups allocated to the expanded virtual memory, a target memory group comprising a page on which a page fault has occurred; and migrating the target memory group from one of the host memory, the accelerator memory, and the storage device that includes the target memory group, to either one of the host memory and the accelerator memory in which the page fault has occurred, wherein the memory groups comprise a first memory group and a second memory group having different allocations of at least one of the host memory, the accelerator memory, and the storage device.

12. The method of claim 11, wherein the generating of the memory group comprises generating the memory group in response to receiving the memory usage information through a hint function configured to input the memory usage information, wherein hint function comprises information about a feature of data included in the generated memory group.

13. The method of claim 11, wherein the memory usage information comprises a start address of the memory group in the expanded virtual memory, a size of the memory group in the expanded virtual memory, whether the memory group is allocated to the expanded virtual memory, and role information of the memory group.

14. The method of claim 13, wherein the role information of the memory group is information about a feature of data included in the memory group.

15. The method of claim 11, wherein the migrating of the target memory group comprises migrating all pages included in the target memory group comprising the page on which the page fault has occurred.

16. The method of claim 11, further comprising managing the memory groups allocated to the expanded virtual memory with an algorithm configured to perform a range search.

17. The method of claim 16, wherein the managing of the memory groups allocated to the expanded virtual memory with the algorithm configured to perform the range search comprises determining the target memory group comprising the page on which the page fault has occurred using the algorithm configured to perform the range search.

18. The method of claim 11, wherein the migrating of the target memory group comprises, in response to an insufficient space in the host memory to which the target memory group migrates, determining a page that is last accessed among pages included in the host memory and removing all pages included in target memory group to which the page that is last accessed belongs from the host memory.

19. The method of claim 11, wherein the migrating of the target memory group comprises, in response to an insufficient space in the accelerator memory to which the target memory group migrates, determining a page that is last accessed among pages included in the accelerator memory and removing all pages included in target memory group to which the page that is last accessed belongs from the accelerator memory.

20. The method of claim 11, wherein the migrating of the target memory group comprises preferentially migrating pages adjacent to the page on which the page fault has occurred among all the pages included in the target memory group.

* * * * *